United States Patent Office 3,605,617
Patented Sept. 20, 1971

3,605,617
BLANKET CYLINDER BEARING FOR OFFSET PRINTING PRESSES
Erich Wieland, Wurzburg, Germany, assignor to Schnellpressenfabrik Koenig & Bauer Aktiengesellschaft, Wurzburg, Germany
Filed Jan. 13, 1969, Ser. No. 790,756
Claims priority, application Germany, Jan. 27, 1968,
P 16 11 302.3
Int. Cl. B41f 7/04, 13/28
U.S. Cl. 101—218      14 Claims

ABSTRACT OF THE DISCLOSURE

The invention relates to a blanket cylinder bearing of an offset printing press for the alternate throwing on and off from one or two cylinders by mounting the axle of the blanket cylinder at both ends in eccentric bushings.

PRIOR ART

Bearings of this kind have become known by the German patent specifications 1,227,916 and 1,236,529. The patent specification 1,227,916 refers to an automatic throw-off device operating in case of paper jams. In this case the throw-off action is initiated by an excessive rise of force. The patent specification 1,236,529 deals with a rigid cylinder bearing. This is achieved by arranging counter-pressure bearings which are acting on especially shaped bearing rings. This arrangement seems to involve a high expenditure and large-scale construction. Furthermore, this type of bearing cannot easily be sealed against the penetration of foreign bodies.

SUMMARY OF THE INVENTION

It is an object of this invention to provide a bearing which is free from backlash in all radial directions so that there will be no stagger marks on the printing image; which will offer a possibility for throwing on and off the blanket cylinder from the impression cylinder as well as from the plate cylinder; with which a pressure adjustment towards both the cylinders can be effected and which allows a spring action or yielding action of the blanket cylinder on both cylinders mentioned if a predetermined printing pressure were exceeded.

The problem is solved by arranging beside the hitherto known eccentric bushings further eccentric bushings which serve as balancers and whose fulcrum points form a joint rhombus of fulcrum points with those of eccentric bushings designed as links, whereby the two balancers arranged in each of the two end frames are pivoted and have a common fulcrum in the bore of each frame. Each axle journal of the blanket cylinder forms thereby the common fulcrum respectively of the two coupling members. The fulcrum joining the balancers and the link is preferably positioned on the central line of the blanket cylinder and the associated cylinder.

According to the invention the third point of bearing is also arranged at either side of the frame which exerts a force on the blanket cylinder axle in direction of the bisectrix of the angle between the two central lines of the blanket cylinder and the adjacent cylinders. It is possible to generate an effect of the spring loaded element in the direction of the angle bisectrix, which is formed by the two central lines of the adjacent cylinders, or in opposite direction. In this case the position of the eccentric points or the position of the balancers has to be exchanged. In the second design a spring action of the blanket cylinder in case of overload is not possible. This arrangement is suitable for presses which have to run under an especially high printing pressure. Thereby the balancers can be moved by cam shafts, whereby it is preferable to have a common shaft for both the cams on either end. The cams which operate the balancers are designed in such a manner that one balancer moves after the other. The angular position of the balancers can be set by means of adjusting members which act between the cams and balancers.

In case of throwing off the blanket cylinder from only one cylinder, e.g., the impression cylinder, the balancer initiating the operation brings about also a slight throw-off motion from the other cylinder when the other balancer is standing still effected by the pivoted link in joint action with the counterlink. This can be compensated by selecting the adequate shape of the cam operating the other balancer. This is easily possible if both cams are driven by a common shaft.

The bearing of the blanket cylinder according to the invention solves the problem of the invention. Moreover, an arrangement of a solid and clear construction has been devised which can be easily sealed off against the penetration of foreign bodies.

By modifying the inventive conception, it is possible to mount one balancer in the eccentric point of the other balancer and to design the free eccentric point of the first one as a bearing. However, against the mentioned conception this design has the disadvantage that the three-point bracing of the axle journals and consequently the complete backlash-free arrangement cannot be obtained.

BRIEF DESCRIPTION OF THE DRAWINGS

An embodiment of the invention is hereinafter described by way of example with reference to the accompanying drawings. But it is clearly to be understood that the invention is by no means restricted to the details of this embodiment.

DESCRIPTION OF THE PREFERRED EMBODIMENT

Figure 1:
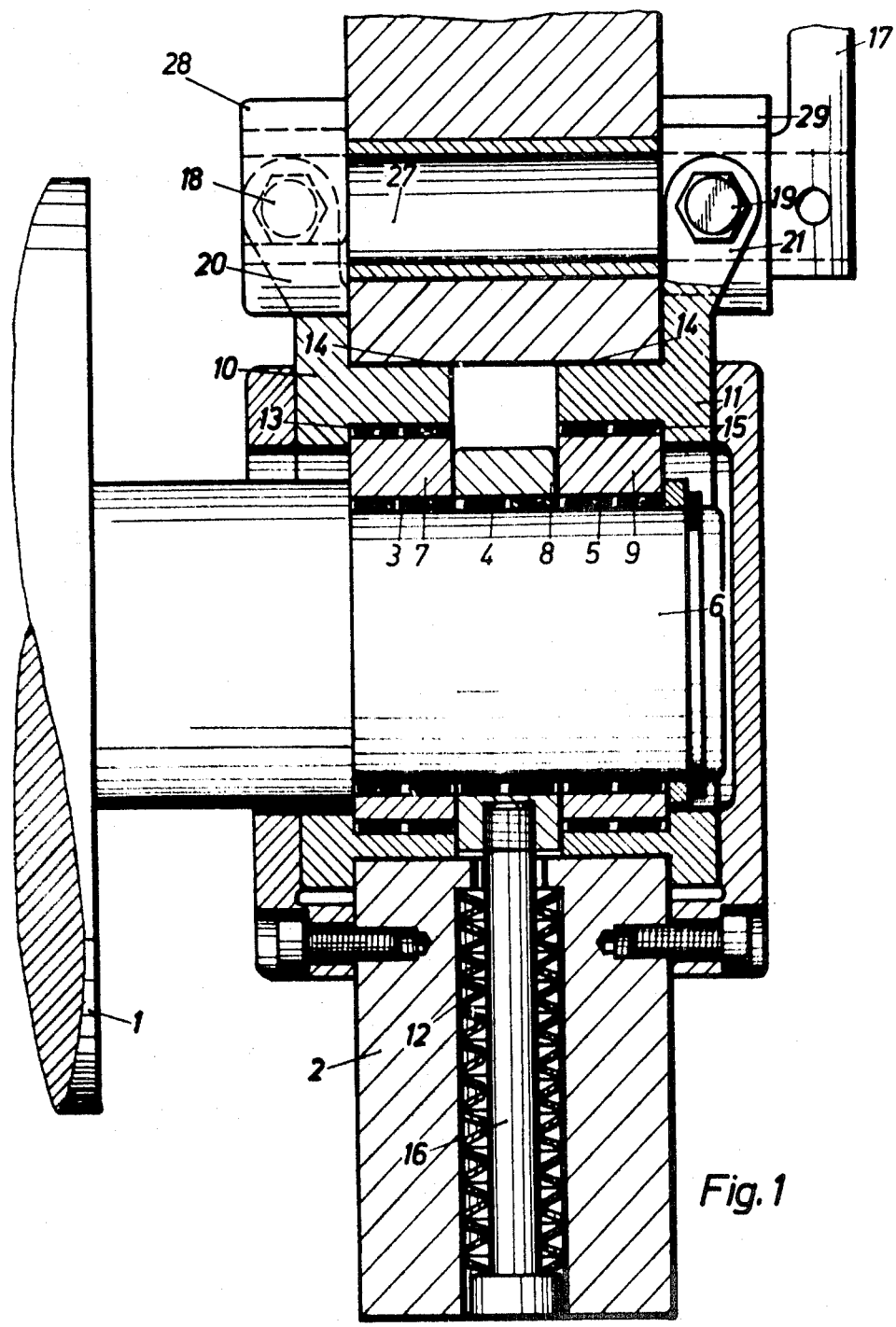
FIG. 1 shows a cross section through the bearing of the blanket cylinder.

The blanket cylinder 1 is mounted in the side frames of the offset printing press with its axle journals protruding on either side. FIG. 1 shows a bearing in a side frame 2, surrounding the axle journal 6 with three anti-friction bearings 3, 4 and 5. The outer races 7 and 9 of the anti-friction bearings 3 and 5 are running with their outside diameter eccentrically to the axle journal 6 and they are forming the inner races of the anti-friction bearings 13 and 15. Eccentrically machined bushings 10 and 11 are pivoted in the bore 14 of the frame and they form the outer races of anti-friction bearings 13 and 15. An outer race 8 for bearing 4 of journal 6 is pretensioned by a spring 12 and is protected against distortion by a spring-loaded guide pilot rod 16.

The eccentrically machined bushings 10 and 11 have radially projecting shanks 20 and 21 respectively, by means of which the bushings 10 and 11 can be turned in the bore 14 of the frame. Adjusting screws 18 and 19 respectively in the shanks 20 and 21 ride on respective cam surfaces 28 and 29 on the cam shaft 27. The cam shaft 27 is mounted in the side frame 2 and has a lever arm 17 for turning the shaft 27 about its axis.

Figure 2:
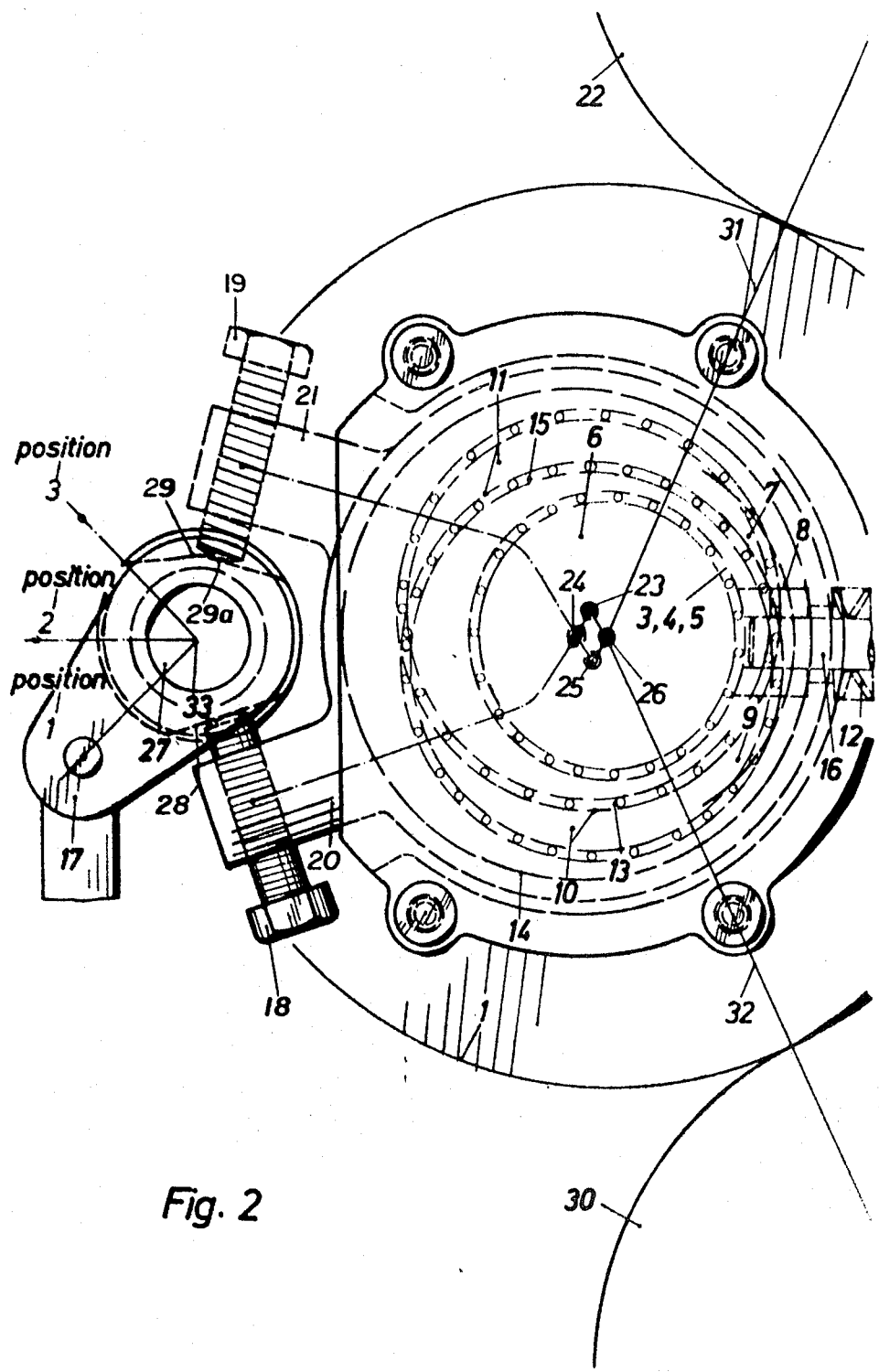
FIG. 2 a lateral view of this bearing.

FIG. 2 shows a lateral view of the blanket cylinder 1 where the side frame is omitted. The center of the anti-friction bearing 13 is numbered 23, the center of the anti-friction bearing 15 is numbered 25. The bore 14 of the frame has the center 24 and the blanket cylinder 1, i.e., its axle journal 6 has the center 26. The centers or fulcrum points 23 to 26 are arranged similar to the corners of a rhombus. From the point of view of gear engineering the bushings 10 and 11 are to be regarded as balancers which are driven respectively by the shanks or lower arms 20 and 21. Their common fulcrum is the bore 14 of the frame. The centers 23 and 25 are considered as pivotal points of the links which consist of the outer races 7 and 9. When moving, for example, shank 21 of the bushing 11 there is turning around the axis 24 of the bore 14 of the frame.

When considering FIG. 1 only, it would seem impossible that axle 6 could move transverse to its axis. However, FIG. 2 shows that axle 6 can move transverse to its axis. Supposing there is a paper wrap, i.e. several layers of paper, between cylinder 22 and cylinder 1, then a force acts on center 26 of axle or journal 6 of cylinder 1. The eccentric bushing 7 with its center 23 of its effective outer diameter is rotated by the application of force at 26 around 23, at the same time journal 6 acts on the eccentric bushing 9 having point 25 as center of its effective outer diameter. However, this bushing 9 has lever arm 21 thereon. Owing to the outer application of force this bushing 9 and its lever arm rotates in bore 14 of the frame. The screw 19 on lever arm or shank 21 is lifted by cam 29. Owing to the rotary motion of point 26 around point 23, the center 26 approaches point 24, however, in view of this, bolt 16 in spring 12 in the frame 2 also approaches point 24, and spring 12 is additionally tensioned. In this movement, there is allowed the spring action or yielding action of the blanket cylinder.

In printing position, the two cylinders 22 and 30 are in contact with the blanket cylinder. The number 22 may be the plate cylinder and 30 the impression cylinder. Preferably the center 25 is on the central line 31 of the blanket cylinder 1 and of the plate cylinder 22 and the center 23 is on the central line 32 of the blanket cylinder 1 and of the impression cylinder 30. Supposing a motion of the bushing 11, as already mentioned, the center 26 moves to the center 23, however owing to the second link 9 there is a secondary deviation of the axis 26 around the center 25, which can be compensated by the proper construction of the operating cam. For expediency's sake, the cams 28 and 29 are so designed that the balancers, i.e., bushings 10 and 11 are operated one after the other. Upon turning the cam shaft 27 the cam 28 will first of all operate the shank 20, before the cam 28 moves the shank 20 out of the position indicated in the drawing. The transfer of the cam motion to the shanks is effected by the adjusting screws 18 and 19 so that the position of the centers 23 and 25 can be selected within certain limits by turning these screws. If one shank, for example, the shank 20, is to stand still during the revolution of the cam shaft 27, then the cam 29 has to be designed in a certain area, see at 29a in FIG. 2, with a cylindrical surface whose axis 33 is that of the cam shaft 27, i.e., that certain area must have a constant radius from axis 33. For expediency's sake this radius should be varied in the area concerned to an extent corresponding to this magnitude for the compensation of the deviation mentioned, i.e., axis 26 around center 25.

The cams 28 and 29 are to be staggered to each other for a rate of angle so that they do not operate the shanks 20 and 21 at the same time. Therefore, three positions can be selected with the lever 17:

1st position: blanket cylinder 1 is in touch with both the cylinders 22 and 30,

2nd position: blanket cylinder 1 is only in touch with plate cylinder 22, and

3rd position: blanket cylinder 1 is thrown off from both cylinders 22 and 30.

What is claimed is:

1. In a bearing for a blanket cylinder of an offset printing press having eccentric bushing means for its journal bearing mounted in a bore of a frame at each end for the alternate throwing on and off from one or two cylinders of the press, said eccentric bushing means comprising a first pair of eccentric bushings rotatably mounted in the bore of the end frame and arranged to serve as two balancers having a common fulcrum point in said bore and a second pair of eccentric bushings about said journal and rotatable respectively in said first pair of eccentric bushings, said second pair of eccentric bushings forming links for transmitting motion between said journal and said first pair of eccentric bushings and vice versa, said second pair of eccentric bushings having a common fulcrum point in the center of said journal, the inner effective diameter and outer effective diameter of said cooperating respective first and second pair of eccentric bushings having respectively common fulcrum points, said four respective common fulcrum points forming the corner points of a rhombus.

2. Apparatus according to claim 1 in which a fulcrum joining the respective balancer and link is positioned substantially on an extension of a central line respectively between the center of the blanket cylinder and the center of an associated cylinder.

3. Apparatus according to claim 1 in which a third point of bearing is arranged at either end of the frame for the journals of the blanket cylinder and has resilient means acting thereon and exerting a force on the blanket cylinder axle in the direction of a bisectrix of the angle between two central lines between the centers of the blanket cylinder and adjacent associated cylinders.

4. Apparatus according to claim 1 including a cam shaft having cams mounted adjacent said balancers to rotate the same.

5. Apparatus according to claim 4 including adjusting members interposed between said balancers and their respective operating cams for adjusting the angular position of the balancers with respect to said cams.

6. Apparatus according to claim 4 in which said cam for each of said balancers is mounted on a common shaft.

7. Apparatus according to claim 1 including cam shafts having cams being adapted to rotate one balancer after the other.

8. Apparatus according to claim 1 wherein cam surfaces on an operating cam shaft for said first pair of eccentric bushings are so shaped that on throwing off the blanket cylinder from one cylinder, said balancer initiating the operation brings about a slight throw off motion from the other cylinder when the other balancer is standing still in response to its pivoted link in joint action with the other pivoted link.

9. A press having a plate cylinder and an impression cylinder mounted to rotate about fixed axes and a rotatably mounted blanket cylinder having a journal at each end and adapted at times to be in contact with the plate cylinder and the impression cylinder and for alternate throwing on and off from one or both of said other cylinders;

said blanket cylinder having eccentric bushing means for its journals mounted in a bore of a frame at each end of the press for said alternate throwing on and off;

said eccentric bushing means including,
a first pair of eccentric bushings rotatably mounted in the bore of said frame at each end and having a common fulcrum point in said bore and arranged to serve as balancers,
a second pair of eccentric bushings rotatably mounted about said journal, rotatable within said respective first pair of eccentric bushings and having a common fulcrum point with the center of said journal,
one of said bushings of the first pair having its effective inner diameter fulcrum point common with the fulcrum point of the effective outer diameter of the bushing mounted therein,
the other of said bushings of the first pair having its effective inner diameter fulcrum point common with the fulcrum point of the effective outer diameter of the respective bushing mounted therein, said fulcrum points forming in spaced relationship from each other a joint rhombus lying in a plane transverse to the axes of said cylinders, said second pair of eccentric bushings forming links for transmitting motion respectively between said first pair of eccentric bushings and said journal and vice versa;

cam means adjacent said first pair of eccentric bushings, said cam means having a cam for each of said bushings of the first pair, adjusting means interposed between each of the bushings of said first pair and its respective cam whereby the distance of the blanket cylinder to each of said other cylinders can be adjusted, a common operator for said cam means, one of said cams being so shaped that on operating said common operator said first pair of eccentric bushings are moved one after the other, said adjusting means for each of said bushings of the first pair permitting free rotation thereof through force transmitted by the respective bushing of the second pair of bushings and the journal of said blanket cylinder when paper wraps occur between said blanket cylinder and one of said other cylinders; and an additional outer bearing race on each of said journals of the blanket cylinder and within said end frames, each of said additional outer bearing race having resilient means acting thereon and exerting a force on the journal of the blanket cylinder in the direction of a bisectrix of the angle between two central lines between the centers of the blanket cylinder and said adjacent associated cylinders.

10. Apparatus according to claim 9 in which said common fulcrum point of a respective first and second eccentric bushing of said first and second pairs of eccentric bushings lies substantially on an extension of a central line respectively between the center of the blanket cylinder journal and the center of one of said associated cylinders.

11. Apparatus according to claim 10 wherein said common operator for said cam means is a shaft and said cams are on said shaft and operated thereby.

12. Apparatus according to claim 11 wherein said common fulcrum point of a respective first and second eccentric bushing of said first and second pairs of eccentric bushings lies substantially on an extension of a central-line respectively between the center of the blanket cylinder journal and the center of one of said associated cylinders.

13. Apparatus according to claim 9 wherein each of said bushings of the first pair has a shank thereon and said adjusting means for each is a screw threadedly received in a threaded aperture in each of said shanks and said screw bares on its respective cam.

14. Apparatus according to claim 9 wherein said common operator for said cam means is a shaft and said cams are on said shaft and operated thereby.

References Cited

UNITED STATES PATENTS

| | | | |
|---|---|---|---|
| 1,565,264 | 12/1925 | Dubi | 308—62X |
| 2,467,199 | 4/1949 | Faeber | 101—348 |
| 2,750,883 | 6/1956 | Dietrich et al. | 101—348 |
| 2,986,086 | 5/1961 | Siebke | 101—218 |
| 3,276,362 | 10/1966 | Grunig | 101—216 |
| 3,470,816 | 10/1969 | Piecha et al. | 101—218X |
| 2,855,846 | 10/1958 | Harless et al. | 101—218 |

FOREIGN PATENTS

| | | | |
|---|---|---|---|
| 1,227,916 | 11/1966 | Germany | 101—218 |
| 1,236,529 | 3/1967 | Germany | 101—218 |

J. REED FISHER, Primary Examiner

U.S. Cl. X.R.

308—62